United States Patent [19]

Nakajima et al.

[11] Patent Number: 4,710,875
[45] Date of Patent: * Dec. 1, 1987

[54] ALIGNMENT PROCEDURE FOR RADIATION IMAGES UNDERGOING SUBTRACTION PROCESSING

[75] Inventors: Nobuyoshi Nakajima; Kazuhiro Hishinuma, both of Kanagawa, Japan

[73] Assignee: Fuji Photo Film Co., Ltd., Kanagawa, Japan

[*] Notice: The portion of the term of this patent subsequent to Jan. 14, 2003 has been disclaimed.

[21] Appl. No.: 477,571

[22] Filed: Mar. 21, 1983

[30] Foreign Application Priority Data

Mar. 20, 1982 [JP] Japan ................... 57-45473

[51] Int. Cl.$^4$ .............................. H04N 5/32
[52] U.S. Cl. ................. 364/414; 250/491.1; 358/111; 378/162
[58] Field of Search ............ 250/327.2, 491.1; 358/111; 364/414; 378/162, 163

[56] References Cited

U.S. PATENT DOCUMENTS

| 3,603,728 | 9/1971 | Arimura | 358/101 |
| 4,186,412 | 1/1980 | Arimura | 358/101 |
| 4,204,225 | 5/1980 | Mistretta | 358/111 |
| 4,276,473 | 6/1981 | Kato et al. | 250/327.2 |
| 4,327,292 | 4/1982 | Wang et al. | 250/491.1 |
| 4,394,684 | 7/1983 | Verhoeven | 358/111 |
| 4,468,697 | 8/1984 | Verhoeven | 358/111 |
| 4,482,918 | 11/1984 | Keyes et al. | 358/111 |
| 4,513,078 | 4/1985 | Sandrik et al. | 430/496 |
| 4,564,861 | 1/1986 | Hishinuma et al. | 358/111 |

FOREIGN PATENT DOCUMENTS 0081227  6/1983  European Pat. Off. .
2057221  3/1981  United Kingdom .

OTHER PUBLICATIONS

European Search Report No. 89,665, published Sep. 1983, based on application EP 83102787.
Kruger, R. A. et al., "A Digital Video Image Processor for Real-Time X-Ray Subtraction Imaging", Optical Engineering, vol. 17, No. 6, Nov./Dec. 1978, 652-7.

Primary Examiner—Jerry Smith
Assistant Examiner—Clark A. Jablon
Attorney, Agent, or Firm—Sughrue, Mion, Zinn, Macpeak and Seas

[57] ABSTRACT

Markers for providing reference points or lines are recorded together with radiation images on stimulable phosphor sheets in a position fixed with respect to the radiation images. The stimulable phosphor sheets are scanned with stimulating rays, and the spatial coordinates of reference points or lines are detected from digital data of the images detected from light emitted from the stimulable phosphor sheets. Rotation and shift among the radiation images are calculated based on the reference points or lines. One of the radiation images is rotated on the digital data when positional deviation exists and moved on the digital data when positional deviation exists. Subtraction of the image data is then conducted among the corresponding picture elements of the radiation images to extract an image of a specific portion of the radiation images.

6 Claims, 12 Drawing Figures

ALIGNMENT PROCEDURE FOR RADIATION IMAGES UNDERGOING SUBTRACTION PROCESSING

BACKGROUND OF THE INVENTION

1. Field of the Invention

This invention relates to a subtraction processing method for radiation images, and more particularly to a subtraction processing method in a radiation image recording and reproducing method comprising the steps of exposing the stimulable phosphor sheet carrying a radiation image stored therein to stimulating rays to sequentially release the radiation energy stored in the stimulable phosphor sheet as light emission, photoelectrically reading out the emitted light by use of a photodetector, and reproducing the obtained image signal as a visible image.

2. Description of the Prior Art

When certain kinds of phosphors are exposed to a radiation such as X-rays, α-rays, β-rays, γ-rays or ultraviolet rays, they store a part of the energy of the radiation. Then, when the phosphor which has been exposed to the radiation is exposed to stimulating rays such as visible light, light is emitted from the phosphor in proportion to the stored energy of the radiation. A phosphor exhibiting such properties is referred to as a stimulable phosphor.

As disclosed in U.S. Pat. No. 4,258,264 and Japanese Unexamined Patent Publication No. 56(1981)-11395, it has been proposed to use a stimulable phosphor in a radiation image recording and read-out system. Specifically, the stimulable phosphor formed on a sheet is first exposed to a radiation transmitting through an object to have a radiation image stored therein, and is then scanned with stimulating rays such as laser beam which causes it to emit light in the pattern of the stored image. The light emitted from the stimulable phosphor sheet upon stimulation thereof is photoelectrically detected and converted to an electric image signal, which is processed as desired to reproduce a visible image on a recording medium such as photographic light-sensitive material or on a display such as cathode ray tube (CRT).

This radiation image system using the stimulable phosphor sheet is advantageous over the conventional radiography using a silver halide photographic material in that the image can be recorded over a very wide range (latitude) of radiation exposure and further in that the electric signal used for reproducing the visible image can be freely processed to improve the image quality for viewing, particularly diagnostic purposes. In more detail, since the amount of light emitted upon stimulation after the radiation energy is stored in the phosphor varies over a very wide range in proportion to the amount of energy stored therein, it is possible to obtain an image having desirable density regardless of the amount of exposure of the phosphor to the radiation by reading out the emitted light with an appropriate read-out gain and converting it to an electric signal to reproduce a visible image on a recording medium or a display. The electric signal may further be processed as desired to obtain a radiation image suitable for viewing, particularly diagnostic purposes. This is very advantageous in practical use.

As mentioned above, in the radiation image system using a stimulable phosphor, deviation of the level of the radiation energy stored in the stimulable phosphor from a desired level can easily be compensated by setting the read-out gain to an appropriate value when photoelectrically reading out the light emitted from the stimulable phosphor upon stimulation thereof. Therefore, the quality of the reproduced radiation image is not adversely affected by a change in radiation dose due to fluctuating tube voltage or MAS value of the radiation source, a variation in the sensitivity of the stimulable phosphor or the photodetector, a change in radiation dose according to the condition of the object, or a change in the radiation transmittance according to the object etc. Further, it is possible to obtain a desirable radiation image even when the radiation dose to the object is reduced. Further, it is possible to obtain a radiation image having high image quality of high contrast, high sharpness and low noise etc. by once converting the light emitted from the stimulable phosphor into an electric signal, and processing the electric signal as desired. Particularly, when the radiation image is used for medical diagnosis, it is possible to obtain a radiation image processed in accordance with the portion of a human body such as the heart, the chest etc. and improve the diagnostic efficiency and accuracy.

There has heretofore been known a subtraction processing method wherein an image of a specific structure (for example, an organ, the bone, the blood vessel, or the like) of human body is extracted by use of two or more X-ray photographic films to correctly diagnose the specific structure. In general, the known subtraction processing method is classified into the so-called temporal (time difference) subtraction processing method and the so-called energy subtraction processing method. In the former method, an image of a specific structure is extracted by subtracting the digital image signal of an X-ray image obtained without injection of a contrast media from the digital image signal of an X-ray image in which the image of the specific structure is enhanced by the injection of a contrast media. In the latter method, an object is exposed to X-rays having energy distributions different from each other to obtain two X-ray images respectively containing the images of a specific structure recorded on the basis of the intrinsic X-ray energy absorption characteristics of the specific structure. Then, each X-ray image is weighted appropriately, and subjected to subtraction to extract the image of the specific structure.

However, the aforesaid subtraction processing method using the X-ray photographic films is disadvantageous in that, since the X-ray photographic films generally exhibit non-linear gradation and a narrow latitude of exposure, it is impossible to obtain a subtraction image of high quality. Further, in this conventional subtraction processing method using the X-ray photographic films, one X-ray image is inverted, two X-ray photographic films are manually superposed one upon the other, and the subtracted image is recorded on a third photographic film. Therefore, it is not always possible to correctly superpose the X-ray images recorded on the two X-ray photographic films one upon the other and remove images other than the structure to be diagnosed, and it is very troublesome to match the positions of the X-ray photographic films to each other Accordingly, the aforesaid subtraction processing method using the X-ray photographic films is not always effective for diagnosis, and has not been used widely, except for a particular use.

Recently, the so-called digital subtraction processing method or digital radiography (hereinafter referred to as "DR") has attracted attention since, if the image data is a digital value, the subtraction processing can be conducted by use of a computer without using the troublesome photographic subtraction technique. As the DR, there have heretofore been known digital fluorography wherein the output of an X-ray fluoroscopic camera comprising an image intensifier tube (I.I. tube) and a television camera is digitally processed, and scanned projection radiography utilizing the X-ray detecting system of computed tomography, such as Xe detector. The subtraction image obtained by the DR is practicably advantageous over the subtraction image obtained by use of the conventional X-ray photographic films in that subtraction can be electrically conducted by digital processing. However, the DR presents a problem that the spatial resolution of the subtraction image obtained by use of the DR generally depends on the resolution of the X-ray image detector such as I.I. tube, Xe detector, or the like, and that the spatial resolution of the subtraction image becomes lower than that obtained by the conventional method using the X-ray photographic films, making it impossible to sufficiently accurately diagnose a specific structure. Further, since the recording range in the DR is limited by the light receiving area of the X-ray image detector such as I.I. tube, Xe detector, or the like, the DR presents another problem that it is impossible to obtain a subtraction image of a wide range of portion of the human body at one time.

Also in the aforesaid radiation image system using a stimulable phosphor sheet, it is possible to conduct various digital processings since a final radiation image can be reproduced on various output devices after reading out a radiation image once stored in the stimulable phosphor sheet by use of stimulating rays, detecting the light emitted from the stimulable phosphor sheet upon stimulation thereof by a photodetector, converting the thus detected electric signal into a digital signal, and processing the signal in various ways. Namely, if said radiation image system is utilized for the subtraction processing, it is possible to obtain the advantage of the aforesaid DR, i.e. the advantage that it is possible to conduct a digital processing. Further, said radiation image system can provide an image having markedly higher spatial resolution compared with the conventional DR since it is possible to decreased the beam diameter of the stimulating rays (laser beam) employed for scanning the stimulable phosphor sheet, increase the number of picture elements per unit area, and directly record the final output of the image data obtained by the subtraction processing and various image processings on a light-sensitive material such as silver halide photographic material. Therefore, theoretically, it is possible to obtain a sharp subtraction image having a spatial resolution higher than visual resolution of human eyes. Further, since there is no technical obstruction to make and use the larger size of the stimulable phosphor sheet, it is possible to obtain at one time a subtraction image over a large area covering a wide range of portion of the human body. Thus, the radiation image system using a stimulable phosphor sheet has many important features that the conventional DR does not possess.

However, experiments conducted to obtain a subtraction image in the aforesaid radiation image system using a stimulable phosphor sheet revealed the problems described below.

Namely, when a subtraction image is obtained in the radiation image system using a stimulable phosphor sheet, two stimulable phosphor sheets (in some cases, three or more stimulable phosphor sheets) are sequentially or simultaneously inserted into an image recording table, radiation images to be subtraction processed are recorded on the stimulable phosphor sheets, the stimulable phosphor sheets carrying the radiation images stored therein are then inserted one by one into an image read-out apparatus, and the radiation images to be subtraction processed are read-out from the stimulable phosphor sheets. During this course, even when the recording and the read-out are conducted very carefully, a shift and a rotation occur between the images to be subtraction processed. As a result, an image to be erased in the subtraction processing is not erased, or an image to be extracted is erased to develop an artifact. In this case, therefore, a correct subtraction image cannot be obtained, and a very real problem is presented with respect to diagnosis.

In the radiation image system using a stimulable phosphor sheet, a radiation image is stored as a latent image in the stimulable phosphor sheet. Therefore, when a deviation occurs between the radiation images stored in the stimulable phosphor sheets, the two X-ray images cannot be visually matched to each other, and it is not always possible to correct the deviation, unlike the X-ray photographic films on which X-ray images are recorded as visible images.

Further, even when the shift and the rotational deviation between the two radiation images can be detected by use of some means, much time is required for the conventional operation processing to be conducted to correct the detected data of the radiation images, particularly in the case of correction of the rotation. This is a very real problem in practical use.

SUMMARY OF THE INVENTION

The primary object of the present invention is to provide a subtraction processing method in a radiation image system using a stimulable phosphor sheet, which can automatically correct a shift and a rotation occurring between radiation images stored in the stimulable sheets.

Another object of the present invention is to provide a subtraction processing method in a radiation image system using a stimulable phosphor sheet, which can conduct correction of a deviation in position more quickly than the conventional operation processing method.

The above objects of the present invention are accomplished by a subtraction processing method for radiation images including the steps of recording two or more radiation images on separate stimulable phosphor sheets, at least a part of the image information being different among said radiation images, scanning the respective stimulable phosphor sheets with stimulating rays to sequentially release the radiation energy stored in the stimulable phosphor sheets as light emissions, photoelectrically detecting the emitted light using light detecting means to obtain digital image signals corresponding to the respective radiation images, and extracting an image of a specific portion of said radiation images by conducting subtraction processing among said digital data, the subtraction processing method comprising:

(i) when each radiation image to be subtraction processed is recorded on each stimulable phosphor sheet, simultaneously recording a marker having such a shape as provides a reference point or a reference line for said stimulable phosphor sheet at a position fixed with respect to said radiation image, (ii) scanning said stimulable phosphor sheet carrying said radiation image stored therein with stimulating rays, and detecting the spatial coordinates of said reference point or said reference line as provided by said marker from the digital image signals of said image detected from the light emitted from said stimulable phosphor sheet, (iii) conducting steps (i) and (ii) for said two or more radiation images to be subtraction processed, (iv) calculating a rotation and a shift among said two or more radiation images based on the respective reference points or reference lines in said two or more deviation images to be subtraction processed, (v) when said rotation exists, rotating digitally either one of said radiation images to be subtraction processed, and/or, when said shift exists, moving digitally either one of said radiation images to be subtraction processed, and conducting subtraction processing of the image data among the corresponding picture elements of said two or more radiation images to be subtraction processed.

In a preferred embodiment of the present invention, when four picture elements approaching a picture element point A by coordinate rotation are taken to be a, b, c and d on the coordinate system before the rotation on said radiation image to be rotated, and when the image data values of said four picture elements a, b, c and d are Sa, Sb, Sc and Sd, respectively, said rotation operation is conducted by expressing the image data value $S_A$ of said picture element point A after the rotation by a weighted means represented by the formula $\cdot S_A = (Wa \cdot Sa + Wb \cdot Sb + Wc \cdot Sc + Wd \cdot Sd)/Wtot$ wherein $Wtot = Wa + Wb + Wc + Wd$, and Wa, Wb, Wc and Wd respectively are the weight coefficients corresponding to picture elements a, b, c and d, or said rotation operation is conducted by comulating the proportional distribution values of the image data value of said picture element point A by said weight coefficients represented by the formulas $Sa = (Wa/Wtot) \cdot S_A$ $Sb = (Wb/Wtot) \cdot S_A$ $Sc = (Wc/Wtot) \cdot S_A$ $Sd = (Wd/Wtot) \cdot S_A$ for the image data values Sa, Sb, Sc and Sd of the four picture elements a, b, c and d which are the points on the coordinate system before the rotation and which approach said picture element point A by the rotation of the coordinate containing said picture element point A.

The term "marker" as used herein means a small area mark discriminable from a radiation image of an object on the stimulable phosphor sheet. Normally, the marker is recorded on the stimulable phosphor sheet in a position fixed with respect to the radiation image by use of a radiation shielding substance secured to the image recording table. In the present invention, at least one marker having such a shape as provides two or more reference points or reference lines is used.

The term "shift" as used herein means a longitudinal deviation or a transverse deviation of the radiation image of an object with respect to the stimulable phosphor sheet.

The subtraction processing method in accordance with the present invention can automatically correct a shift and a rotation occurring among the radiation images stored in the stimulable phosphor sheets. Accordingly, the present invention can provide a subtraction image which exhibits high contrast resolution and high spatial and which is free of any artifact and very suitable for viewing, particularly diagnostic purposes. Further, the method of the present invention can correct a deviation in position very quickly compared with the conventional operation processing method.

The subtraction processing method in accordance with the present invention embraces the aforesaid temporal (time difference) subtraction processing, the energy subtraction processing, and a combination of these processings.

In the present invention, in order to improve the signal-to-noise ratio, it is preferable that the stimulable phosphor emits light having a wavelength range not overlapping upon the range of wavelength of the stimulating ray employed to excite the stimulable phosphor. Preferably, when a laser source which emits stimulating ray having a wavelength within the range between 600 nm and 700 nm, such as a He-Ne laser, is used, a stimulable phosphor which emits light having a wavelength within the range between 300 nm and 500 nm should be selected, as disclosed in U.S. Pat. No. 4,258,264.

Further, in order to increase the amount of light read out from the stimulable phosphor and shorten the readout time, it is preferable to use a gas ion laser source emitting a laser beam having a wavelength range shorter than 600 nm, such as an $Ar^+$ laser beam (488 nm, 514.5 nm), a $Kr^+$ laser beam (520.9 nm, 530.9 nm, 568.2 nm), or an $Ar^+ - Kr^+$ laser beam.

As the stimulable phosphor, for example, rare earth activated alkaline each metal fluorohalide phosphor is preferred. One example of this phosphor is, as shown in DE-OS No. 2,928,245, a phosphor represented by the formula $(Ba_{1-x-y}, Mg_x, Ca_y)FX: aEu^{2+}$ wherein X is at least one of Cl and Br, x and y are numbers satisfying $0 < +y \leq 0.6$ and $xy \neq 0$, and a is a number satisfying $10^{-6} \leq a \leq 5 \times 10^{-2}$. Another example of this phosphor is, as shown in U.S. Pat. No. 4,239,968, a phosphor represented by the formula $(Ba_{1-x}, M^{II}_x)FX: yA$ wherein $M^{II}$ is at least one of Mg, Ca, Sr, Zn and Cd, X is at least one of Cl, Br and I, A is at least one of Eu, Tb, Ce, Tm, Dy, Pr, Ho, Nd, Yb and Er, x is a number satisfying $0 \leq \leq 0.6$, and y is a number satisfying $0 \leq y \leq 0.2$. Further, as the stimulable phosphor to be used in this invention can be used ZnS: Cu,Pb; $BaQ \cdot xAl_2O_3$: Eu wherein $0.8 \leq \leq 10$; and $M^{II}O \cdot xSiO_2$: A wherein $M^{II}$ is Mg, Ca, Sr, Zn, Cd or Ba, A is Ce, Tb, Eu, Tm, Pb, Tl, Bi or Mn, and x is number satisfying $0.5 \leq x \leq 2.5$, as shown in U.S. Pat. No. 4,236,078. Furthermore, as the stimulable phosphor can be used LnOX: xA wherein Ln is at least one of La, Y, Gd and Lu, X is at least one of Cl and Br, A is at least one of Ce and Tb, x is a number satisfying $0 < x < 0.1$, as shown in U.S. Pat. No. 4,236,078. Among the above enumerated phosphors, the rare earth activated alkaline earth metal fluorohalide phosphor is the most preferable, among which barium fluorohalides are the most preferable in view of the high intensity of emission of light.

Further, barium fluorohalide phosphors added with a metal fluoride as disclosed in Japanese Unexamined Patent Publication Nos. 56(1981)-2385 and 56(1981)-2386, or barium fluorohalide phosphors containing at least one of a metal chloride, a metal bromide and a metal iodide as disclosed in European Patent Publication No. 29,963 are also preferable because of their improved light emitting characteristics.

It is also desirable to color the phosphor layer of the stimulable phosphor sheet made of the above phosphor by use of pigments or dyes to improve the sharpness of the image obtained thereby as disclosed in European Patent Publication No. 21,174.

As for the signal processing, it is possible to employ a frequency processing as disclosed in U.S. Pat. No. 4,315,318 or European Patent Publication No. 31,952, and a gradation processing as disclosed in U.S. Pat. Nos. 4,302,672, 4,276,473 or 4,310,886.

DESCRIPTION OF THE PREFERRED EMBODIMENTS

The present invention will hereinbelow be described in further detail with reference to the accompanying drawings.

Figure 1:
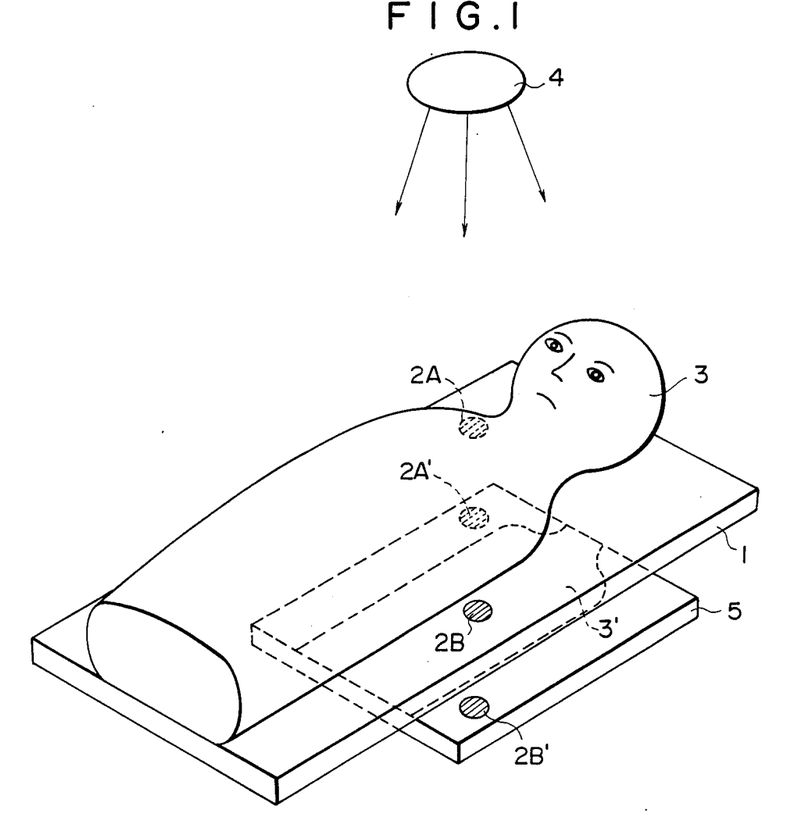
FIG. 1 is a schematic view showing an example of recording of a marker on a stimulable phosphor sheet.

Referring to FIG. 1 showing an example of recording of a marker on a stimulable phosphor sheet, two circular marker forming members 2A and 2B made of a radiation shielding substance are secured to two marginal portions on an image recording table 1. At the radiation image recording step, X-rays are emitted from an X-ray source 4 positioned above the image recording table 1, and the marker forming members 2A and 2B are recorded, together with an object 3, on a stimulable phosphor sheet 5 positioned under the image recording table 1.

Since the marker forming members 2A and 2B secured to the image recording table 1 are recorded on the stimulable phosphor sheet 5 together with the stationary object 3, the relationship between the positions of markers 2A' and 2B' and an object image 3' recorded on the stimulable phosphor sheet 5 does not change even when the recording is repeated by sequentially exchanging the stimulable phosphor sheet 5 with a new stimulable phosphor sheet to conduct a subtraction processing.

Accordingly, when separate stimulable phosphor sheets are sequentially or simultaneously inserted into the image recording table 1 to record different radiation images of the same object 3 on the stimulable phosphor sheets for the purpose of obtaining a subtraction image, the relationship between the positions of the markers 2A' and 2B' and the object image 3' does not change even if the relative position of the object image 3' deviates with respect to the stimulable phosphor sheet 5 and even if the relative position of stimulating rays used in the read-out step deviates with respect to the object image 3'.

Namely, it is possible to obtain a subtraction image of high quality by detecting the positions of the markers recorded on the respective stimulable phosphor sheets 5, correcting a deviation in position occurring between the radiation images in terms of read out image data based on the detected marker positions, and conducting subtraction processing.

As the marker, it is necessary to employ one or more markers providing at least two reference points or reference lines in order to correct a rotation and a shift occurring between radiation images.

Methods of detecting the reference points or reference lines by using the marker recorded on the stimulable phosphor sheet will be described below.

Figure 2:
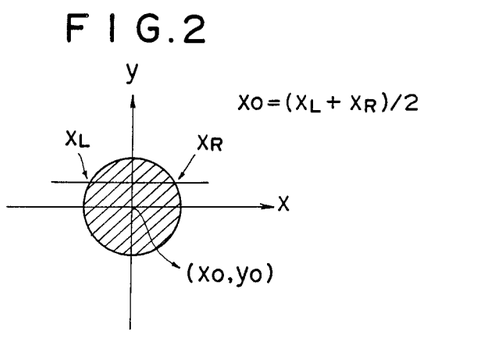
FIGS. 2 to 7 are schematic views showing various markers and the methods of detecting the markers.

When the marker is circular as shown in FIG. 2, the reference point is the central point of the circle. In this case, therefore, it is possible to measure a rotation and a shift occurring between radiation images by using at least two circular markers. In order to detect the reference point, i.e. the central point of the circle in the circular marker, for example, coordinates of the edge portion of the marker are detected by scanning on the image signals. If the x coordinates of both edge are taken to be $x_L$ and $x_R$, the x coordinate of the central point of the circle can be calculated by $$x_0 = (x_L + x_R)/2.$$

This operation is conducted for all scanning lines crossing the circle to increase the number of the xo sample values calculated by the above formula, and the average of all xo sample values is calculated to accurately obtain the x coordinate of the center of the circle. In order to obtain the coordinate of the y coordinate of the center of the circle, scanning is conducted many times in the y direction and the similar operation may be conducted. Alternatively, in order to simplify the procedure, scanning may be conducted only in one direction, for example, only in the x direction, thereby to measure the x coordinate of the center of the circle as described above, and the y coordinate of the scanning line on which the absolute value $|x_L - x_R|$ is the maximum (i.e. the diameter of the circle) amy be taken as the y coordinate of the center of the circle.

Figure 3:
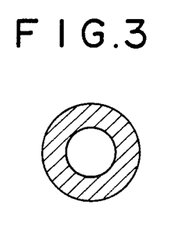
Figure 4:
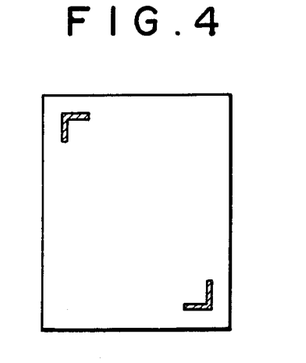
Figure 5:
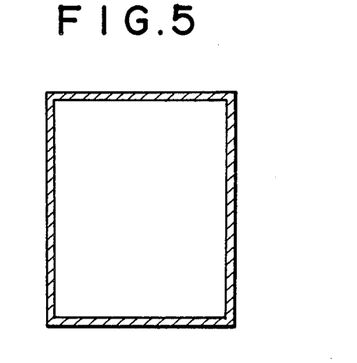

Also for a hollow concentric circle marker as shown in FIG. 3, the center coordinates of the marker can be calculated in the same manner as described above. In this case, since the number of the sample points (i.e. the number of the edge points to be detected) can be increased by conducting the above-mentioned procedure both for the outer circle and the inner circle of the marker, it is possible to obtain the center coordinates more accurately. It is also advantageous to employ two L-shaped markers as shown in FIG. 4. In this case, two reference points can be obtained from the two L-shaped markers by detecting the edge points of the markers, obtaining the equations of the straight lines constituting the respective L shapes by the method of least square, and calculating the coordinates of the intersecting points of the straight lines of the respective L shapes. Use of the L-shaped marker is advantageous since, even when only one L-shaped marker is employed, it is possible to obtain one reference point and one reference line. It is also advantageous to employ a frame-like marker extending along four sides of the area exposed by X-ray as shown in FIG. 5. In this case, detection of the edges of the marker is simplified since the marker exists at the marginal portion of the image area.

In the present invention, any number of markers may be employed. However, it is advantageous to employ as many markers as possible since it is possible to avoid a failure of obtaining the reference points or reference lines by using some of the markers, for example, when they get out of the image area due to a large shift or a large angle of rotation. Further, the marker setting positions should preferably be spaced apart as far as possible since the distance between the reference points or the reference lines becomes large and an error due to fluctuation in the accuracy of detecting the reference points or the reference lines of the markers becomes small. Although the size of the marker is not limited, it will be selected appropriately so that it does not present an obstacle to the object image to be observed.

Figure 6:
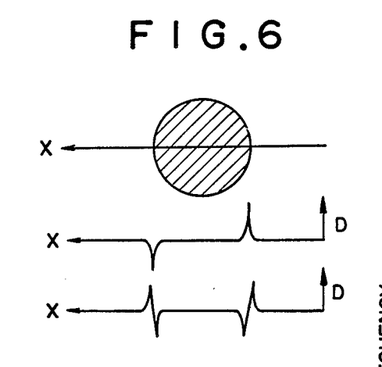
Figure 7:
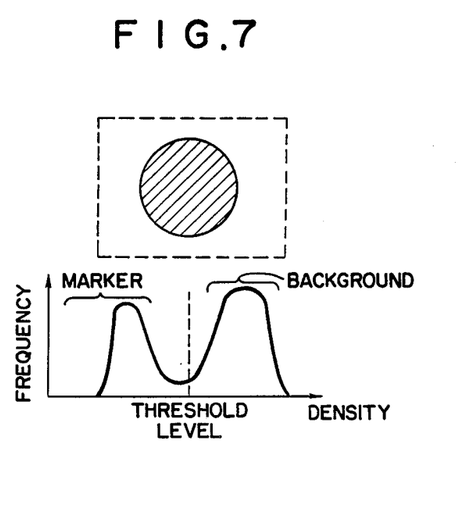

As the method of detecting the edge of the marker, the edge can be extracted, for example, by the first order differentiation (this may be for the difference between the adjacent picture elements) or by the second order differentiation as shown in FIG. 6. Since the radiation image portion other than the portion like the edge of the marker artificially provided exhibits relatively small changes in the contrast, the marker edge can be easily discriminated from the other radiation image portion. Further, as shown in FIG. 7, it is also possible to detect the edge of the marker by predetermining a region (surrounded by the dotted line in FIG. 7) as follows: A density histogram for this region will be plotted and a threshold density level which discriminates between the marker and the background will be obtained based on this histogram. As seen in FIG. 7, the histogram has a lower peak which indicates the density distribution of the marker, and a higher peak which indicates the density distribution of the background. Then the density of the marker will be separated from the density of the background, and the aforesaid first order differentiation, the second order differentiation, or the like will be conducted.

The detection of the marker as described above may be conducted simultaneously with the storing of the radiation image read out as the digital image signals in the memory, or may be conducted by once storing the image signals in the memory and then reading out the image signals in the memory.

After the reference points or the reference lines of the marker are detected, correction values for the shift and the rotation are calculated. By way of example, calculations for the case wherein two markers respectively having one reference point as shown in FIG. 1 are used are described below. When the correction of deviations is conducted by rotating one image A and shifting the other image B in the x and y directions with reference to the image after rotation, the correction value for the rotation is expressed by $$\Delta\theta = \tan^{-1}\left(\frac{yB2 - yB1}{xB2 - xB1}\right) - \tan^{-1}\left(\frac{yA2 - yA1}{xA2 - xA1}\right),$$

the correction value for the shift of a reference point 1 in the x direction is expressed by $$\Delta x1 = xB1 - \{(xA1 - Cx)\cos\Delta\theta - (yA1 - Cy)\sin\Delta\theta + Cx\},$$

the correction value for the shift of a reference point 2 in the x direction is represented by $$\Delta x2 = xB2 - \{(xA2 - Cx)\cos\Delta\theta - (yA2 - Cy)\sin\Delta\theta + Cx\},$$

the correction value for the shift of the reference point 1 in the y direction is represented by $$\Delta y1 = yB1 - \{(xA1 - Cx)\sin\Delta\theta + (yA1 - Cy)\cos\Delta\theta + Cy\},$$

and the correction value for the shift of the reference point 2 in the y direction is expressed by $$\Delta y2 = yB2 - \{(xA2 - Cx)\sin\Delta\theta + (yA2 - Cy)\cos\Delta\theta + Cy\}$$

wherein (xA1,yA1) designates the coordinates of the reference point 1 of the image A, (xA2,yA2) designates the coordinates of the reference point 2 of the image A, (xB1,yB1) denotes the coordinates of the reference point 1 of the image B, (xB2,yB2) denotes the coordinates of the reference point 2 of the image B, Cx designates the x coordinate of the center of rotation (arbitrary), and Cy designates the y coordinate of the center of rotation (arbitrary).

In the above-mentioned formulae, two kinds of correction values for the shift, i.e. $\Delta x1$ and $\Delta x2$, $\Delta y1$ and $\Delta y2$ are derived. These values are not always equal to each other. This is because, in many cases, the accuracy of detecting the reference points or the reference lines detected by the above-described detection method for the marker edge will not increase above the accuracy limited by the spatial frequency, and therefore there is a possibility of the occurrence of a sampling error. However, for (xA1,yA1), (xB1,yB1), (xA2,yA2), and (xB2,yB2) calculated extremely accurately, the influence of the sampling error is extremely small, and the sampling error scarcely presents a problem. Normally, therefore, as the correction values can be taken the average values expressed by the formulae of $\Delta x = (\Delta x1 + \Delta x2)/2$ and $\Delta y = (\Delta y1 + \Delta y2)/2$. The number of the significant digits of $\Delta\theta$ depends on the desired rotation accuracy of the picture element to be rotated. Although $\Delta x$ and $\Delta y$ are normally not integers, the image quality of the finally obtained image is scarcely affected even when these values are handled as integers by half-adjust. It is also possible to use the fractions below the decimal point by interpolation.

The calculation of the correction values is not limited to the above-described method, and various other calculation methods may also be employed. For example, it is also possible to employ a calculation method wherein correction of the shift is conducted, and then correction of the rotation is carried out.

On the basis of the correction values calculated as described above, one of the two images to be subtraction processed is rotated to correct the rotation, the shift in both x and y direction is corrected, and subtraction is conducted between the corresponding picture elements. The correction of the deviations of the images will hereinbelow be described in further detail.

(i) Correction of rotation

Figure 8:
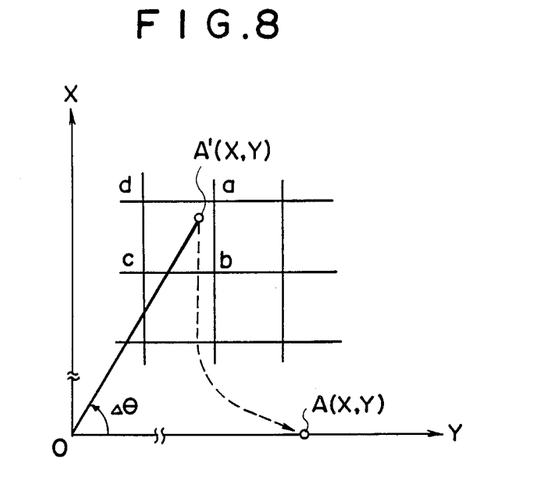
FIG. 8 is an explanatory view showing the correction of a rotation by approximately expressing the picture elements by grid points.

FIG. 8 is an explanatory view showing the correction of a rotation by approximately expressing the picture elements by grid points.

The image rotation is conducted based on the rotation $\Delta\theta$ obtained by detecting the reference points or the reference lines of the markers. When a point A(x,y) on the two-dimensional image grid point system as shown in FIG. 8 is considered as an objective point, the present coordinate values of a point A'(x,y) which should be positioned at the coordinates of the point A(x,y) after the rotation are calculated by the conversion formulae of $$X = x \cos \Delta\theta + y \sin \Delta\theta \quad (1)$$
$$Y = -x \sin \Delta\theta + \cos \Delta\theta$$

That is, basically, the image signal value $S_A'$ of A' may be substituted for the image signal value $S_A$ of A. However, as is clear from FIG. 8, image signal value does not necessarily exist on the coordinate value calculated by the Formulae (1). Therefore, as the image signal value of A', it is necessary to use a value obtained by interpolating with the image signals of the grid points existing around A'. This will hereinbelow be explained in further detail by use of actual picture elements.

Figure 9:
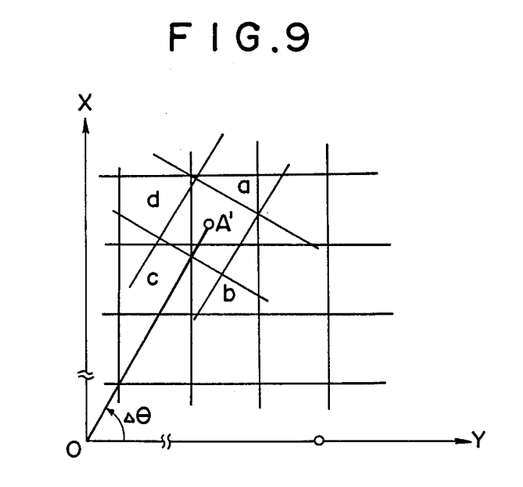
FIG. 9 is an explanatory view showing the interpolating operation in the correction of a rotation when the picture elements are sampled in a square form.

FIG. 9 is an explanatory view showing the interpolating operation for the correction of the rotation when the shape of the picture elements are assumed to be square. When the picture element A' is superposed upon picture elements a, b, c and d as a result of the rotation conversion, areas Wa, Wb, Wc and Wd over which the picture element A' is superposed upon the picture elements a, b, c and d, respectively, are calculated and normalized by Wa+Wb+Wc+Wd=1. In this case, it is necessary to substitute the weighted mean value expressed by the formula of $$S_A' = Wa \cdot Sa + Wb \cdot Sb + Wc \cdot Sc + Wd \cdot Sd$$

wherein Sa, Sb, Sc and Sd designate the image signal values of the picture elements a, b, c and d, respectively, for the image signal value $S_A'$ of the picture element A'. The interpolating operation method has been explained above for the case wherein the picture element A' is superposed on four proximity picture elements as shown in FIG. 9. However, there can be various instances where the picture element A' is superposed on five picture elements, six picture elements, and so on, and the manner of superposition is not alway same.

The method of conducting strictly area calculations to carry out rotation conversion of one picture element as described above is not always practicable since an indefinite number of manners of superposition must be discriminated and extremely troublesome and time-consuming processings are required. (it will take several hours to several days for a large computer to conduct the processings, depending on the amount of the image data handled). Accordingly, in order to simplify the interpolating operation and quickly conduct the rotation conversion, the inventors developed four approximate interpolating operation methods and evaluated these methods.

Type A:

Of the four picture elements a, b, c and d surrounding the picture element A', the picture element nearest to the picture element A' is selected. The image signal value of the selected point is substituted for the image signal value $S_A'$ of the picture element A' calculated by Formulae (1). (In FIG. 8, $S_A' = Sa$)

Type B:

Weight coefficients Wa, Wb, Wc and Wd are selected in advance so that, of the four picture elements a, b, c and d surrounding the picture element A', the picture element nearest to the picture element A' has the largest weight coefficient. Image signal values Sa, Sb, Sc and Sd of the four picture elements a, b, c and d are multiplied respectively by the weight coefficients Wa, Wb, Wc and Wd to obtain the weighted mean value, and the weighted mean value thus obtained is substituted for the image signal value $S_A'$ of the picture element A'. Namely, $$S_A' = (Wa \cdot Sa + Wb \cdot Sb + Wc \cdot Sc + Wd \cdot Sd)/Wtot$$

wherein Wtot = Wa+Wb+Wc+Wd.

Figure 10:
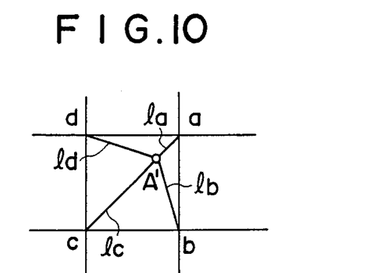
FIG. 10 is an explanatory view showing the distances between a picture element grid point A' and four proximity picture element grid points moved by rotation when the picture elements are approximated by grid points.

Type C:

FIG. 10 is an explanatory view showing the distances between the picture element A' and four proximity picture elements moved by rotation when the picture elements are approximately represented by points.

As shown in FIG. 10, distances la, lb, lc and ld between the picture element A' and the four picture elements a, b, c and d surrounding the picture element A' are calculated. Reciprocals 1/la, 1/lb, 1/lc and 1/ld of the respective distances are selected as the weight coefficients, and the picture element signal values Sa, Sb, Sc and Sd of the four picture elements a, b, c and d are respectively multiplied by the weight coefficients to obtain the weighted mean value. The weighted mean value thus obtained is substituted for the image signal value $S_A'$ of the picture element A'. Namely, $$S_A' = (1/la \cdot Sa + 1/lb \cdot Sb + 1/lc \cdot Sc + 1/ld \cdot Sd)/Wtot$$

wherein $Wtot = 1/la + 1/lb + 1/lc + 1/ld$.

Figure 11A:
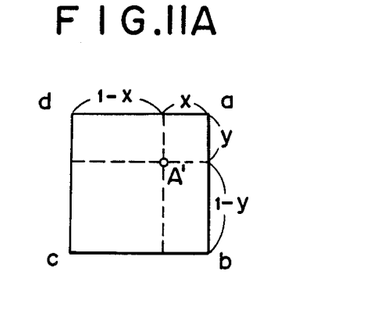
FIG. 11A is an explanatory view showing the method of calculating the interpolation coefficients of type D when the picture elements are approximated by grid points.
Figure 11B:
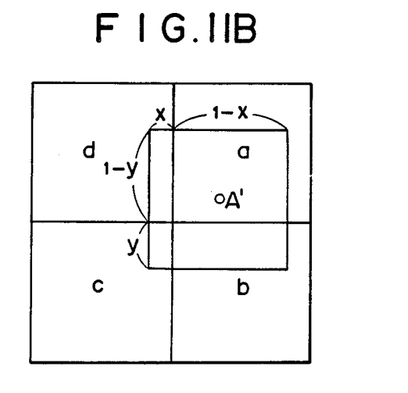
FIG. 11B is an explanatory view showing the method of FIG. 11A in terms of actual square picture elements.

Type D:

FIG. 11A is an explanatory view showing the method of calculating the interpolation coefficients of type D when the picture elements are approximately represented by points, and FIG. 11B is an explanatory view showing the method of FIG. 11A by use of square picture elements.

As shown in FIGS 11A and 11B, at the step of calculating the areas over which the picture elements A' is superposed upon the four picture elements a, b, c and d, the areas are calculated in such a manner that the intersection angle between the picture element A' and each of the picture elements a, b, c and d is approximately assumed to zero. The areas thus obtained are employed as the weight coefficients for the picture elements a, b, c and d. The image signal values Sa, Sb, Sc and Sd of the four picture elements are multiplied by the weight coefficients to obtain the weighted mean value, and the weighted mean value thus obtained is substituted for the image signal value $S_A'$ of the picture element A'. Namely, $$S_A' = Wa \cdot Sa + Wb \cdot Sb + Wc \cdot Sc + Wd \cdot Sd$$

wherein Wa $=(1-y)\cdot(1-x)$, Wb $=y\cdot(1-x)$, Wc $=x,y$, and Wd $=(1-y)\cdot x$ in the case shown in FIGS. 11A and 11B.

For the above-mentioned four types of interpolating operation method, the image quality of the subtraction images obtained and the operation time were evaluated. The results were as shown in Table 1.

TABLE 1

|  | Operation time | Image quality |
|---|---|---|
| TYPE A | 1 (5 minutes) | 4 |
| TYPE B | 2 (8 minutes) | 3 |
| TYPE C | 4 (25 minutes) | 2 |
| TYPE D | 3 (11 minutes) | 1 |

*The operation time was evaluated by the grade number of 1 to 4 in the order of shorter time.
*The image quality was evaluated by the grade number of 1 to 4 in the order of excellent image quality when visually estimated.
*Coefficients in type B were Wa = 4, Wb = 2, Wc = 1.
*The operation time was the CPU operation time required for FACOM M160 to calculate for 2000 × 1700 picture elements.

Evaluation of the above-mentioned four operation processing methods with respect to the image quality and the operation time shown that type D is most excellent because of relatively short operation time and high image quality.

Specifically, in type A, an artifact develops for a radiation image having linear-like patterns wherein there is a large change in contrast, for example, for an image of the edge portion of the bone, and adversely affects the image quality. However, since the operation time is short, type A is effective for a radiation image wherein the change in contrast is small.

In type B, the degree of occurrence of artifact reduces compared with type A. Weight coefficients of Wa=4, Wb=Wd=2 and Wc=1 were used, since, in this system, images of highest image quality could be obtained by use of these weight coefficients.

In type C, the image quality is almost the same as the image quality in type B, and only the operation time increases.

Type D provides most excellent images although the operation time somewhat increases compared with type A and type B. This is because, in this system, it has been found that the rotation is at most about 2°, and almost the same results as those of the calculation using the strict area ratios can be obtained with the area ratios approximately calculated by the simple method by assuming that the angles of the aforesaid picture element A' with respect to the picture elements a, b, c and d are zero. (The operation time shown in Table 1 can further be shortened by using a special processing unit suitable for this rotation method.)

The above-described technique is an embodiment of the method for obtaining the image signal value $S_A$ of a picture element A by the interpolation using the image signal values Sa, Sb, Sc, and Sd of the four picture elements moving to the positions proximate to the picture element A. Conversely, it is also possible to employ the image signal values Sa, Sb, Sc and Sd of four picture elements proximate to the position to which the image signal value $S_A$ of the aforesaid picture element A shifts as a result of rotation, and cumulate the proportional distribution values expressed by the formulae of $$Sa = (Wa/Wtot) S_A$$

$$Sb = (Wb/Wtot) S_A$$

$$Sc = (Wc/Wtot) S_A$$

$$Sd = (Wd/Wtot) S_A$$

on the image signal values Sa, Sb, Sc and Sd by using the aforesaid weight coefficients Wa, Wb, Wc and Wd.

Further, in the above-described technique, the image signal value on the coordinate system before rotation is calculated by interpolation based on the image signal value of the coordinate system after rotation. Conversely, it is also possible to calculate by interpolation the image signal value on the coordinate system after rotation based on the image signal value on the coordinate system before rotation in accordance with the similar interpolating technique.

Correction of the shift, i.e. the deviation in the x and y directions will now be described below.

(ii) Correction of shift

When the shift values Δx and Δy are not integers, they are handled as integers by half-adjust or an image signal value is newly obtained by calculating the weighted mean value based on the image signal values of the adjacent picture elements, and either one of the radiation images to be subtraction processed is translated in parallel.

The rotational and the shift are corrected as described above, and then subtracting operation is conducted.

The subtracting operation is conducted by performing subtraction between the corresponding picture elements of two radiation images. It should be understood that the subtraction may be carried out according to the formula shown below, thereby to change the linear gradation and raise or lower the density level of the whole image. However, the operation should preferably be carried out after the logarithmetic conversion of the image signal of the light emitted from the stimulable phosphor. This is because band compression of the original image signal value is thereby achieved, and complete removal of unnecessary image information becomes possible.

$$Ssub = as1 - bs2 + c$$

wherein Ssub designates the subtraction image signal value, s1 and s2 designate the image signal value of the radiation images to be subtraction processed, c is a constant which corrects the density level, and a and b are the constants (a=b in the temporal (time difference) subtraction, or a and b are coefficients determined according to the absorption factor of the structure to be extracted in the energy subtraction).

In the embodiments described above, the correction of the shift is conducted after the correction of the rotation. However, it is also possible to carry out the correction of the rotation after the correction of the shift, or to simultaneously carry out both corrections by performing the aforesaid subtracting operation while the corresponding picture elements are obtained based on Δx and Δy.

Further, when the rotation exists, but the shift does not exist, it is possible to carry out only the correction of the rotation. When the shift exists, but the rotation does not exist, only the correction of the shift may be conducted. When the rotation and the shift do not exist, it is possible to directly carry out the subtracting operation based on the read out data without conducting the correction of deviation.

By subjecting the subtraction image obtained as described above to various signal processings such as processing of frequency response, gradation processing, arithmetic averaging processing, image size reduction processing and image size enlargement processing, it is possible to obtain a subtraction image having high contrast resolution and high spatial resolution and suitable for viewing, particularly diagnostic purposes. The aforesaid various signal processings may be conducted for the radiation images before the subtraction processing.

The subtraction image obtained as described above is reproduced as a visible image on a recording material such as photographic light-sensitive material, or on a CRT.

While the subtraction processing method in accordance with the present invention has been described above for the cases wherein the subtraction image is obtained from two radiation images, a subtraction image can similarly be obtained also from three or more radiation images in accordance with the present invention.

We claim:

1. A subtraction processing method for radiation images including the steps of recording two or more radiation images on separate stimulable phosphor sheets, at least a part of image information being different among said radiation images, scanning the respective stimulable phosphor sheets with stimulating rays to sequentially release the radiation energy stored in the stimulable phosphor sheets as light emission, photoelectrically detecting the emitted light by a light detecting means to obtain digital image signal corresponding to the respective radiation images, and extracting an image of a specific portion of said radiation images by conducting a subtraction processing among said digital image signal, the subtraction processing method for radiation images comprising:

(i) when each radiation image to be subtraction processed is recorded on each stimulable phosphor sheet, simultaneously recording a marker having such a shape as provides a reference point or a reference line to said stimulable phosphor sheet in a position fixed with respect to said radiation image, (ii) scanning said stimulable phosphor sheet carrying said radiation image stored therein with stimulating rays, and detecting the position coordinate of said reference point or said reference line provided by said marker from the digital image signal of said image detected from the light emitted from said stimulable phosphor sheet, (iii) conducting the steps i) and ii) for said two or more radiation images to be subtraction processed, (iv) calculating a rotation and a shift among said two or more radiation images based on the respective reference points or reference lines corresponding to said two or more radiation images to be subtraction processed, (v) when said rotation exists, rotating digitally either one of said radiation images to be subtraction processed, and/or when said shift exists, moving digitally either one of said radiation images to be subtraction processed, and conducting a subtraction processing of the image signal value among the corresponding picture elements of said two or more radiation images to be subtraction processed.

2. A method as defined in claim 1 wherein, when four picture elements approaching a picture element point A by coordinate rotation are taken to be a, b, c and d on the coordinate system before the rotation operation on said radiation image to be rotated, and when the image signal values of said four picture elements a, b, c and d are Sa, Sb, Sc and Sd, respectively, said rotation operation is conducted by expressing the image signal value $S_A$ of said picture element point A after the rotation by a weighted mean represented by the formula of $$S_A = (Wa \cdot Sa + Wb \cdot Sb + Wc \cdot Sc + Wd \cdot Sd)/Wtot$$

wherein $Wtot = Wa + Wb + Wc + Wd$, and Wa, Wb, Wc and Wd respectively are the weight coefficients corresponding to picture elements a, b, c and d, or said rotation is conducted by cumulating the proportional distribution values of the image signal value $S_A$ of said picture element point A by said weight coefficients represented by the formulae of $$Sa = (Wa/Wtot) \cdot S_A$$

$$Sb = (Wb/Wtot) \cdot S_A$$

$$Sc = (Wc/Wtot) \cdot S_A$$

$$Sd = (Wd/Wtot) \cdot S_A$$

for the image signal values Sa, Sb, Sc and Sd of the four picture elements a, b, c and d which are the points on the coordinate system before the rotation operation and which approach said picture element point A by the rotation operation of the coordinate including said picture element point A.

3. A method as defined in claim 2 wherein said weight coefficients Wa, Wb, Wc and Wd are the weight coefficients selected in advance and having the largest value for the weight coefficient corresponding to the picture element nearest to the aforesaid picture element A among said four picture elements proximate to said picture element A.

4. A method as defined in claim 2 wherein said weight coefficients Wa, Wb, Wc and Wd are 1/la, 1/lb, 1/lc and 1/ld, respectively when the distances between said picture element A and said four picture elements a, b, c and d are taken to be la, lb, lc and ld, respectively.

5. A method as defined in claim 2 wherein said weight coefficients Wa, Wb, Wc and Wd are areas calculated by making the approximation that the rotation angle is zero in the course of calculating the areas over which said picture element A is superposed upon said four picture elements.

6. A method as defined in claim 2 wherein said weight coefficients Wa, Wb, Wc and Wd are the weight coefficients having a value other than zero only for the weight coefficient corresponding to the picture element nearest to said picture element A among four picture elements a, b, c and d approaching said picture element A, the remaining weight coefficients being zero.

* * * * *